United States Patent [19]
Sullivan et al.

[11] Patent Number: 5,684,973
[45] Date of Patent: Nov. 4, 1997

[54] EXPANDABLE MEMORY SYSTEM AND METHOD FOR INTERLEAVING ADDRESSES AMONG MEMORY BANKS OF DIFFERENT SPEEDS AND SIZES

[75] Inventors: Timothy J. Sullivan, Clinton; Cynthia J. Burns, Franklin; Albert T. Andrade, North Grafton; Ralph C. Frangioso, Jr., Franklin, all of Mass.

[73] Assignee: Data General Corporation, Westboro, Mass.

[21] Appl. No.: 706,175

[22] Filed: Aug. 30, 1996

Related U.S. Application Data

[63] Continuation of Ser. No. 29,905, Mar. 11, 1993, abandoned.

[51] Int. Cl.$^6$ .......................... G06F 12/00; G06F 13/00
[52] U.S. Cl. .................... 395/405; 364/DIG. 1; 364/DIG. 2; 365/189.02; 365/230.02; 365/230.03; 395/454; 395/484; 395/494
[58] Field of Search ............... 365/189.02, 230.02, 365/230.03; 395/405, 445, 454, 481, 484, 494; 364/DIG. 1, DIG. 2

[56] References Cited

U.S. PATENT DOCUMENTS

| | | | |
|---|---|---|---|
| 3,974,479 | 8/1976 | Kotok et al. | 395/495 |
| 4,860,252 | 8/1989 | Sykora | 395/425 |
| 4,866,603 | 9/1989 | Chiba | 395/425 |
| 4,908,789 | 3/1990 | Blokkum et al. | 395/425 |
| 5,175,836 | 12/1992 | Morgan | 395/425 |
| 5,226,134 | 7/1993 | Aldereguia et al. | 395/405 |
| 5,237,672 | 8/1993 | Ing-Simmons et al. | 395/421.01 |
| 5,237,674 | 8/1993 | Mohme et al. | 395/442 |
| 5,269,010 | 12/1993 | MacDonald | 395/425 |
| 5,274,788 | 12/1993 | Koike | 395/405 |
| 5,293,607 | 3/1994 | Brockmann et al. | 395/405 |
| 5,301,278 | 4/1994 | Bowater et al. | 395/275 |
| 5,301,292 | 4/1994 | Hilton et al. | 395/484 |
| 5,341,486 | 8/1994 | Castle | 395/405 |
| 5,357,621 | 10/1994 | Cox | 395/400 |
| 5,412,788 | 5/1995 | Collins et al. | 395/484 |
| 5,446,691 | 8/1995 | North | 365/189.02 |
| 5,483,497 | 1/1996 | Mochizuki et al. | 365/230.03 |
| 5,497,478 | 3/1996 | Murata | 395/484 |
| 5,530,837 | 6/1996 | Williams et al. | 395/434 |
| 5,559,986 | 9/1996 | Alpert et al. | 395/471 |
| 5,572,692 | 11/1996 | Murdoch et al. | 395/405 |

OTHER PUBLICATIONS

IBM Technical Disclosure Bulletin, vol. 32, No. 7, Dec. 1989, New York US pp. 212–213 'Programmable Variable Memory Configuration Control'.

IBM Technical Disclosure Bulletin, vol. 34, No. 10A, Mar. 1992, New York US pp. 91–94 'Programmable Support For Controlling Memory Subsystem Configurations In Personal Computers'.

Copy of Communication dated Jul. 8, 1994 from European Patent Office re EPA No. 94301565.1.

*Primary Examiner*—Tod R. Swann
*Assistant Examiner*—Tuan V. Thai
*Attorney, Agent, or Firm*—Sewall P. Bronstein; Henry D. Pahl, Jr.; David D. Lowry

[57] ABSTRACT

An expandable memory system and a method for operating a memory system having a variable number of memory banks are described. The memory system can utilize a variable number of separately replaceable memory banks which can be implemented with memory element, such as dynamic random access memory chips, which are of differing speeds and or sizes. The memory system implements an interleaving of memory addresses among the memory banks as a function of the number of banks actually present so that successive memory accesses are not unnecessarily delayed by the recovery times of the memory elements. The memory system includes a programmable address decoder having a writable memory which provides bank address signals. Each of the banks includes a respective delay line for providing an output signal a respective presettable time after address signals are received by that bank for signalling to the host that data is ready to be transferred.

6 Claims, 3 Drawing Sheets

RE = resumé EEPROM
MB = MEMORY BANK
DI = DIAGNOSTIC INTERFACE

EXPANDABLE MEMORY SYSTEM AND METHOD FOR INTERLEAVING ADDRESSES AMONG MEMORY BANKS OF DIFFERENT SPEEDS AND SIZES

This application is a continuation of application Ser. No. 08/029,905 filed on Mar. 11, 1993 abandoned.

BACKGROUND OF THE INVENTION

The present invention relates to an expandable memory system for a digital computer and more particularly, to such a system which implements an interleaving function in accordance with the number of memory banks actually present.

As is understood by those skilled in the art, the main directly addressable memory utilized by digital computers is typically implemented by so-called dynamic random access memory integrated circuits or chips (DRAMS). In such integrated circuits, each bit of data is stored as a charge in a capacitance which is included in each memory cell. The cells are typically arranged in a matrix and individual cells are accessed by providing row and column addresses which are utilized to read out the stored charge when a row address strobe signal (RAS) and a column address strobe signal (CAS) are applied. Because of the collective capacitances associated with the lines through which the RAS and CAS signals are applied, there is an inherent recovery time associated with precharging each of those lines. This recovery time must pass before that line is again used for a cell access, the delay for the RAS signal being typically substantially longer than that for the CAS signal. Accordingly, it is desirable to map memory addresses according to an interleaving scheme so that addresses which appear successive to the processor are, in fact, physically in different memory elements. Typically, however, such memory mapping and interleave schemes are fixed and predetermined for an entire memory system regardless of its size. Further, prior art memory systems typically utilize fixed timing throughout the memory system so that all memory elements must provide access to valid data within a predetermined minimum time which is common throughout the memory system. Accordingly, if it is desired to utilized faster memory elements in any part of the memory address space, all memory elements, e.g., DRAMS, must be replaced with the faster components. As is understood, with computer systems of the type which are generally classified as midrange computers, replacement of the entire random access memory can be a very expensive undertaking.

Among the several objects of the present invention may be noted the provision of a digital computer memory system which can be readily expanded in capacity; the provision of such a memory system which provides an interleave function which varies in accordance with the amount of memory actually present; the provision of such a memory system which provides fast access to data stored in the memory; the provision of such a memory system which permits the utilization of memory elements of different speeds; the provision of such a memory system which is highly reliable and which is of relatively simple and inexpensive construction. Other objects and features will be in part apparent and in part pointed out hereinafter.

SUMMARY OF THE INVENTION

The memory system of the present invention comprises a memory subsystem which provides connections for data signals and a plurality of system address signals to a predetermined number of separately replaceable memory banks and which includes means for determining the presence of active memory in each such bank. A programmable address decoder is provided which includes a writable memory which can be read by a predetermined subset of the memory address signals and which provides bank address or select signals which in turn operate to select an individual one of the memory banks to respond to the balance of the system address signals. The subsystem includes also means for determining the number of banks of active memory interconnected with the memory subsystem and for writing into the writable memory, pattern data which provides an interleaved bank address pattern corresponding to the number so determined.

In accordance with another aspect of the present invention, each of a plurality of separately replaceable memory banks comprises a respective multiplicity of similar memory elements which provide data signals at a predetermined time after the application of address signals thereto. In each of the banks, a respective delay means provides an output signal a respective preselectable time after address signals are applied to the memory elements in that bank, the preselected delay time corresponding to the respective predetermined response time of the respective memory elements. Each of said banks also includes signal coupling means responsive to the respective delay means, for signaling to a host subsystem that the data is ready to be transferred from the respective bank. Accordingly, the host subsystem can utilize intermixed memory banks employing memory elements of different speeds.

BRIEF DESCRIPTION OF THE DRAWINGS

Corresponding reference characters indicate corresponding parts throughout the several views of the drawings.

DESCRIPTION OF THE PREFERRED EMBODIMENT

Figure 1:
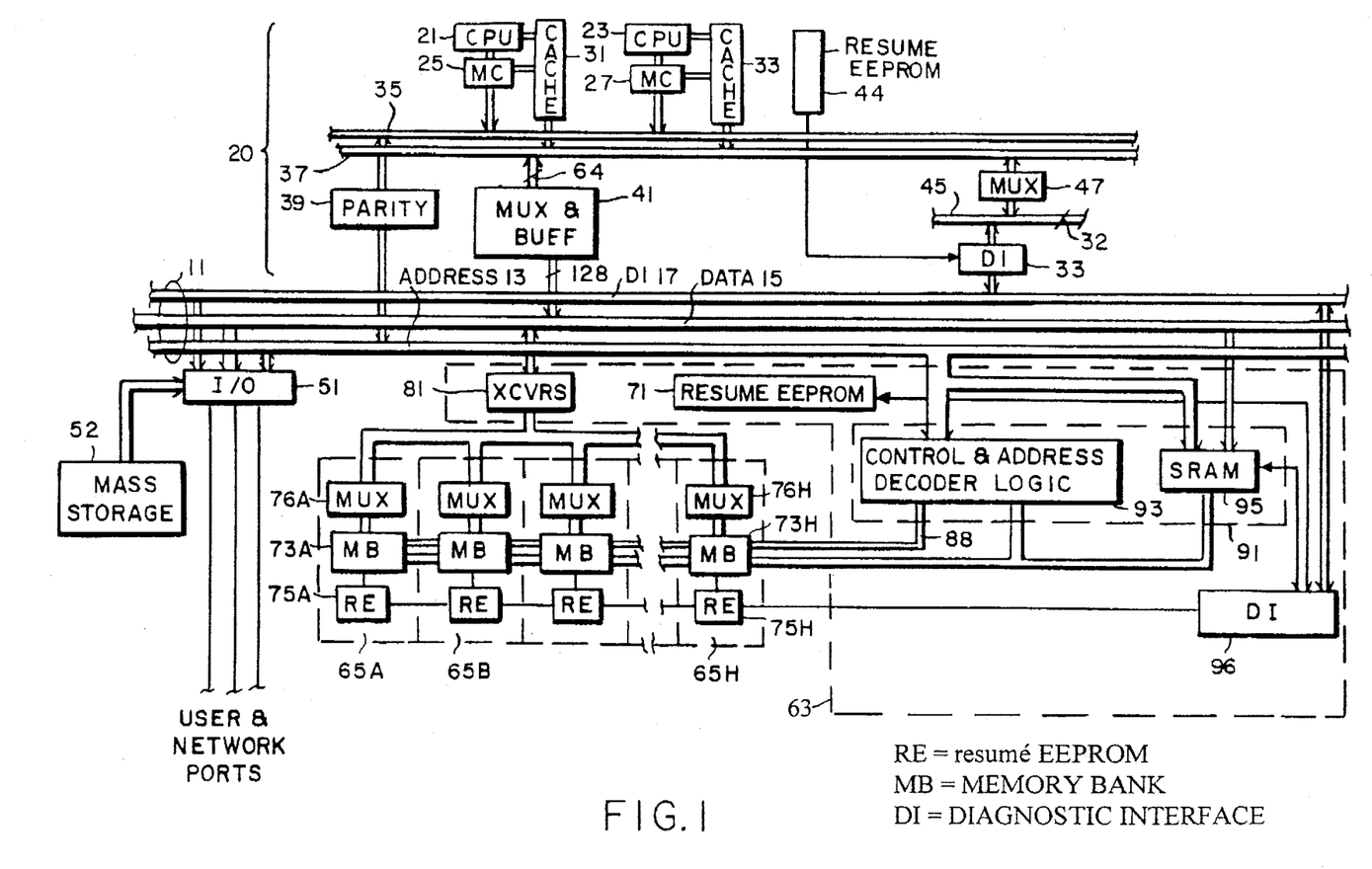
FIG. 1 is a block diagram illustrating the overall arrangement of a digital computer utilizing an expandable memory in accordance with the present invention.

Referring now to FIG. 1, the overall computer system illustrated there is organized around a system bus which is designated generally by reference character 11. This system bus may be considered as being divided into an address bus 13, a data bus 15 and a diagnostic interface bus 17. As is conventional, the bus is implemented as a backplane system into which various subsystems may be plugged. The characteristics of the bus system 11 are described in greater detail in a copending and coassigned application being filed on even date herewith in the names of Timothy J. Sullivan, Ralph C. Frangioso, Jr., Mark A. DesMarais and Lawrence L. Krantz and entitled "*A Data Processing System Using A Non-Multiplexed, Asynchronous Address Data Bus System*" now abandoned in favor of continuing application Ser. No. 08/291,836, now U.S. Pat. No. 5,388,232 and the disclosure of said copending application is incorporated herein by a reference. While the particular operation of the bus and the other system components does not comprise a part of the present invention, the following description may be useful in understanding how the expandable memory system of the present invention interacts with the overall computer system.

The bus system 11 is intended to accommodate multiple processors and, in order to provide an appropriately high throughput, a relatively wide bus structure is implemented, there being 128 bits of data lines and 32 bits of address lines plus an appropriate number of parity and/or ECC (Error Correction Code) bits for each subbus. The bus 11 accommodates processor cards each of which can incorporate two CPU units, one such card being designated by reference character 20 with the processors being identified by reference characters 21 and 23. These CPU's may, in a particular embodiment, be constituted by processors of the Motorola 88000 family. Associated with each CPU is a respective memory controller, 25 and 27, and a high speed cache memory, 31 and 33. Within each processor card is a local bus comprising address lines 35 and data lines 37, this local bus being implemented in accordance with Motorola conventions and standards. Address signals from the local bus are coupled onto the system address bus 13 through a parity checking circuit 39 while data signals are coupled through a multiplexing and buffering circuit system 41.

In its principal mode of operation, the caching scheme implemented by the memory controllers 25 and 27 loads the respective cache memory in increments of 64 bytes, i.e., 512 bits. This quantity of data is hereinafter referred to as a "cache line". To facilitate this mode of operation of the cache memory, it is advantageous that the main memory system be able to provide that quantity of contiguous data with a very short response time and that successive such quantities be available with minimum delay. In accordance with one aspect of the present invention, a flexible interleaving scheme is implemented so that, provided multiple memory banks are present, successive cache lines of data are taken from different banks.

Each card in the overall system also incorporates a diagnostic interface subsystem, this subsystem for the processor card being designated by reference character 33. The diagnostic interface subsystems can read selected registers in each of the respective cards and are utilized during initialization of the system and also during running to note and record various error flags such as parity or ECC hits. The processor card includes a local diagnostic interface bus 45 which can exchange data with the local data bus through a multiplexer 47.

As with each of the other cards in the system, the processor card includes a programmable memory, preferably implemented as an electrically erasable programmable memory (EEPROM), which holds data identifying the card, its characteristics and configuration. This EE PROM is conveniently referred to as a resume' PROM and, in the processor card 20 this PROM is designated by reference character 44.

As is explained in greater detail hereinafter, the expandable memory of the present invention is implemented by means of a motherboard 63 which acts as a subsystem host and provides address and data connections for a plurality of separately replaceable memory banks. These memory banks are implemented as so-called daughter cards which can be separately replaced on the motherboard, these daughter card memory banks being designated by reference characters 65A–65H in FIG. 1.

In addition to processor and memory cards, the system bus 11 will typically also accommodate I/O cards (Input/ Output) which, as indicated by reference character 51, provide interfacing with mass storage devices such as fixed rotating disk memories and tape drives, and also with user and network ports, which provide for access by various devices such as user terminals and workstations.

Referring now to the memory system itself, it can be seen that the motherboard 63 includes a resume' EE PROM 71, as do each of the separately replaceable daughter card memory banks 65A–65H, these resume' EE PROMS being designated 75A–75H.

The memory banks themselves are designated by reference characters 73A–73H, and are implemented relatively conventionally as arrays of D RAM integrated circuits or chips which respond to address and/or bank select signals to designate particular memory locations into which data can be written or read. In relatively conventional fashion, data is coupled between the system data bus 15 and the memory banks through bus transceivers designated generally by reference character 81, and through respective multiplexer/ receivers located on each of the daughter boards. These muliplexer/receivers are designated by reference characters 76A–76H.

However, rather than decoding system addresses on the address bus 13 in a fixed or predetermined manner, the memory system of the present invention incorporates a programmable address decoder 91 which incorporates not only a fixed decoder logic 93 for decoding many of the address bits in conventional fixed fashion, but also a writable memory 95 which, after initiation as described in greater detail hereinafter, responds to selected ones of the system address bits to decode bank select signals which effect an alterable bank interleave function. The fixed logic also handles various control and handshaking signals in essentially conventional fashion, appropriate ones of these signals being passed on to the memory banks as indicated by reference character 88. The writable memory 95 is preferably implemented by means of static RAM (SRAM) and, in the particular embodiment being described, the static RAM comprises 2 K×16 bits of storage. In this context, the letter K is used in conventional fashion as shorthand for a factor of 1024.

In the motherboard 63, the diagnostic interface array 96 includes a write only control register which can be written to through the diagnostic bus. One of the bits in this register is used to enable writing from the data bus 15 to the static RAM 95 instead of to the daughter card memory arrays. The static RAM 95 is written to over the lower sixteen bits of the system data bus with addressing being taken from higher order bits of the address bus as described in greater detail hereinafter.

For each of the 2 K addresses in the static RAM 95, a 16 bit word is written which identifies one of the active daughterboards and also provides certain information regarding its composition and the interleave pattern being utilized. The significance of the particular bits in the particular embodiment being described may be designated as follows:

| Bit | 15 | 14 | 13 | 12 | 11-9 | 8 |
|---|---|---|---|---|---|---|
| | SIXTEEN MEG | EIGHT WAY | FOUR WAY | TWO WAY | RES | ANY SEL |
| Bit | 7 | 6 | 5 4 3 | 2 | 1 | 0 |
| | | | DECODE [7:0] | | | |

| | |
|---|---|
| SIXTEEN MEG | This bit of the SRAM indicates whether the board currently being accessed has 4 or 16 Megabit DRAMS. A '0' indicates 16 Megabit DRAMS while '1' indicates 4 Megabit DRAMS. |
| EIGHT WAY | A '0' indicates that the current access is to a board that is being interleaved on an eight way scheme. This bit is an input to a column address mux pal. A '1' indicates eight way is not being implemented. |
| FOUR WAY | A '0' indicates that the current access is to a board that is being interleaved on a four or eight way scheme. This bit is an input to a column address mux pal. A '1' indicates neither four nor eight way is being implemented. |
| TWO WAY | A '0' on this bit indicates that the current access is to a board that is being interleaved on a two, four, or eight way scheme. This bit is an input to a column address mux pal. A '1' indicates no interleaving at all is being implemented. |
| RES | Bits 11-9 are currently unused and reserved for future use. |
| ANY SEL | ANY SEL is just an 'OR' of the eight daughter board decodes. If any of the N DECODE bits is '1' this bit will be set to a '0'. A '2' on this bit indicates that none of the Aeolus boards are being accessed. |
| DECODE [7:0] | These eight bits correspond to the eight possible daughter boards. Since only one board can be accessed at a time, these bits are mutually exclusive. A '0' on any of the bits indicates the access is to that daughter card. A '1' indicates no access to that board. |

From the point of view of the system bus, memory begins at location "0" and must be continuous. If more than one daughter board is present in the system, the SRAM will be written to provide a decode on alternating cache lines. In other words, adjacent cache lines will not reside on the same daughter card. This can be done by using address bits [8:6] in the address field of the SRAM. The degree of interleaving depends on the number of boards present. The only restriction in this particular embodiment is that the interleave factor must be modulo 2. Thus, five boards would interleave, than the next two would interleave, leaving the last board with contiguous cache lines as in the five board case.

The following table illustrates the pattern for system address bits 8:6, which would be repeatedly written to the SRAM over the range 0 to 3F for system address bits 29:24 in the case where eight daughter boards are employed providing one Gigabyte of memory. Unspecified or reserved SRAM locations are written with 1's.

| System Bus Address Bits | | | Size and Interleave Factors | | | | ANY SEL | Decodes | | | | | | | |
|---|---|---|---|---|---|---|---|---|---|---|---|---|---|---|---|
| [8] | [7] | [6] | 15 | 14 | 13 | 12 | 8 | 7 | 6 | 5 | 4 | 3 | 2 | 1 | 0 |
| 0 | 0 | 0 | 0 | 0 | 0 | 0 | 0 | 1 | 1 | 1 | 1 | 1 | 1 | 1 | 0 |
| 0 | 0 | 1 | 0 | 0 | 0 | 0 | 0 | 1 | 1 | 1 | 1 | 1 | 1 | 0 | 1 |
| 0 | 1 | 0 | 0 | 0 | 0 | 0 | 0 | 1 | 1 | 1 | 1 | 1 | 0 | 1 | 1 |
| 0 | 1 | 1 | 0 | 0 | 0 | 0 | 0 | 1 | 1 | 1 | 1 | 0 | 1 | 1 | 1 |
| 1 | 0 | 0 | 0 | 0 | 0 | 0 | 0 | 1 | 1 | 1 | 0 | 1 | 1 | 1 | 1 |
| 1 | 0 | 1 | 0 | 0 | 0 | 0 | 0 | 1 | 1 | 0 | 1 | 1 | 1 | 1 | 1 |
| 1 | 1 | 0 | 0 | 0 | 0 | 0 | 0 | 1 | 0 | 1 | 1 | 1 | 1 | 1 | 1 |
| 1 | 1 | 1 | 0 | 0 | 0 | 0 | 0 | 0 | 1 | 1 | 1 | 1 | 1 | 1 | 1 | on a 4 way basis (using bits [7:6] to determine which of 4 boards to be accessed) for the lower 128 Mbyte with the upper 32 Mbyte being accessed as straight sequential cache lines. If seven boards were configured, the lower four would The following three tables illustrate the patterns which would be written over the corresponding designated ranges of addresses for an example in which seven daughter boards of 32 Mbytes each provide a total of 224 Mbytes of memory. System Bus Address Bits [27:24]=[0000] thru [0111] (128 Mbyte that is 4-way interleaved)

| System Bus Address Bits | | | Size and Interleave Factors | | | | ANY SEL | Decodes | | | | | | | |
|---|---|---|---|---|---|---|---|---|---|---|---|---|---|---|---|
| [8] | [7] | [6] | 15 | 14 | 13 | 12 | 8 | 7 | 6 | 5 | 4 | 3 | 2 | 1 | 0 |
| 0 | 0 | 0 | 1 | 1 | 0 | 0 | 0 | 1 | 1 | 1 | 1 | 1 | 1 | 1 | 0 |
| 0 | 0 | 1 | 1 | 1 | 0 | 0 | 0 | 1 | 1 | 1 | 1 | 1 | 1 | 0 | 1 |
| 0 | 1 | 0 | 1 | 1 | 0 | 0 | 0 | 1 | 1 | 1 | 1 | 1 | 0 | 1 | 1 |
| 0 | 1 | 1 | 1 | 1 | 0 | 0 | 0 | 1 | 1 | 1 | 1 | 0 | 1 | 1 | 1 |
| 1 | 0 | 0 | 1 | 1 | 0 | 0 | 0 | 1 | 1 | 1 | 1 | 1 | 1 | 1 | 0 |
| 1 | 0 | 1 | 1 | 1 | 0 | 0 | 0 | 1 | 1 | 1 | 1 | 1 | 1 | 0 | 1 |
| 1 | 1 | 0 | 1 | 1 | 0 | 0 | 0 | 1 | 1 | 1 | 1 | 1 | 0 | 1 | 1 |
| 1 | 1 | 1 | 1 | 1 | 1 | 0 | 0 | 1 | 1 | 1 | 1 | 0 | 1 | 1 | 1 |

System Bus Address Bits [27:24]=[1000] thru [1011] (64 Mbyte that is 2-way interleaved)

| System Bus Address Bits | | | Size and Interleave Factors | | | | ANY SEL | Decodes | | | | | | | |
|---|---|---|---|---|---|---|---|---|---|---|---|---|---|---|---|
| [8] | [7] | [6] | 15 | 14 | 13 | 12 | 8 | 7 | 6 | 5 | 4 | 3 | 2 | 1 | 0 |
| 0 | 0 | 0 | 1 | 1 | 1 | 0 | 0 | 1 | 1 | 1 | 0 | 1 | 1 | 1 | 1 |
| 0 | 0 | 1 | 1 | 1 | 1 | 0 | 0 | 1 | 1 | 0 | 1 | 1 | 1 | 1 | 1 |
| 0 | 1 | 0 | 1 | 1 | 1 | 0 | 0 | 1 | 1 | 1 | 0 | 1 | 1 | 1 | 1 |
| 0 | 1 | 1 | 1 | 1 | 1 | 0 | 0 | 1 | 1 | 0 | 1 | 1 | 1 | 1 | 1 |
| 1 | 0 | 0 | 1 | 1 | 1 | 0 | 0 | 1 | 1 | 1 | 0 | 1 | 1 | 1 | 1 |
| 1 | 0 | 1 | 1 | 1 | 1 | 0 | 0 | 1 | 1 | 0 | 1 | 1 | 1 | 1 | 1 |
| 1 | 1 | 0 | 1 | 1 | 1 | 0 | 0 | 1 | 1 | 1 | 0 | 1 | 1 | 1 | 1 |
| 1 | 1 | 1 | 1 | 1 | 1 | 0 | 0 | 1 | 1 | 0 | 1 | 1 | 1 | 1 | 1 |

System Bus Address Bits [27:24]=[1100] thru [1101] (32 Mbyte that is not interleaved)

| System Bus Address Bits | | | Size and Interleave Factors | | | | ANY SEL | Decodes | | | | | | | |
|---|---|---|---|---|---|---|---|---|---|---|---|---|---|---|---|
| [8] | [7] | [6] | 15 | 14 | 13 | 12 | 8 | 7 | 6 | 5 | 4 | 3 | 2 | 1 | 0 |
| 0 | 0 | 0 | 1 | 1 | 1 | 1 | 0 | 1 | 0 | 1 | 1 | 1 | 1 | 1 | 1 |
| 0 | 0 | 1 | 1 | 1 | 1 | 1 | 0 | 1 | 0 | 1 | 1 | 1 | 1 | 1 | 1 |
| 0 | 1 | 0 | 1 | 1 | 1 | 1 | 0 | 1 | 0 | 1 | 1 | 1 | 1 | 1 | 1 |
| 0 | 1 | 1 | 1 | 1 | 1 | 1 | 0 | 1 | 0 | 1 | 1 | 1 | 1 | 1 | 1 |
| 1 | 0 | 0 | 1 | 1 | 1 | 1 | 0 | 1 | 0 | 1 | 1 | 1 | 1 | 1 | 1 |
| 1 | 0 | 1 | 1 | 1 | 1 | 1 | 0 | 1 | 0 | 1 | 1 | 1 | 1 | 1 | 1 |
| 1 | 1 | 0 | 1 | 1 | 1 | 1 | 0 | 1 | 0 | 1 | 1 | 1 | 1 | 1 | 1 |
| 1 | 1 | 1 | 1 | 1 | 1 | 1 | 0 | 1 | 0 | 1 | 1 | 1 | 1 | 1 | 1 |

As will be understood, it is preferable with this particular scheme that the number of banks be equal to a power of two, this being the usual case in actual practice. As will also be understood, more complex interleaving schemes may also be readily implemented using the basic technique of the present invention.

As will be understood from the foregoing, the lower order eight bits implement a simplified decoding of selected ones of the address bits into a board select signal and thus an interleaving pattern can be established by designating a desired daughterboard for each of the address ranges designated by the selected ones of the address bits. The remaining address bits are decoded by fixed decoder logic 93. The bank select and decoded address signals are then applied to the daughter board memory banks so as to select the desired memory elements for writing or reading of data in conventional manner.

During initialization, i.e., during power on reset, an initialization program, typically stored in a PROM on one of the processor boards utilizes the diagnostic subsystem to read the resume' PROMs of each of the boards present on the system to determine that it is in fact present and operational and to determine its characteristics and configuration. In this way the initialization program determines how many motherboards are present and how many memory banks are present on each motherboard. From this information the program can determine the appropriate interleave pattern and write a corresponding set of data words into the static RAM 95. Subsequently, when the system transfers from its initialization or diagnostic mode into its normal running mode, addresses presented by the processors through the address bus system 13 will be decoded by the fixed logic 93 and the SRAM 95 operating in conjunction so as to store and read data accordingly to the desired memory bank interleaving configuration.

As indicated previously, the interleave pattern is configured to distribute successive addresses onto different daughterboards so that the system is not penalized by the delays which may be inherent in attempting to read successively from the same memory chips. Since system bus address bits [8:6] map sequential locations to different daughter boards, they can not be used as CAS address bits when interleaving is done. The CAS address will have to correspond both to the interleaving type and size of the DRAMs on the daughter cards. The following table illustrates, for daughter boards populated with 1×4 MBit DRAMs, the correspondence of system address bus bits with those bits which are directly decoded as RAS and CAS bits and those which are utilized as addresses into the static RAM to generate bank select signals.

The SRAM uses system bus address bits [31:25] and [8:6] for its mapping. Interleaving will occur if the lower bits distribute the address amongst the boards in the system on cache lines. The initiation program can initiate non-interleaving by activating the same N_DECODE on contiguous addresses. In this case, address bits [8:6] map to DRAM column address.

TABLE 1

1 × 4 MBit DRAMs
SYSTEM BUS/DRAM ADDRESS MAPPING

| | INTERLEAVE FACTOR | | | |
|---|---|---|---|---|
| ODY ADR | NON-INTLVD | 2-WAY | 4-WAY | 8-WAY |
| 31 | SRAM A9 | SRAM A9 | SRAM A9 | SRAM A9 |
| 30 | SRAM A8 | SRAM A8 | SRAM A8 | SRAM A8 |
| 29 | SRAM A7 | SRAM A7 | SRAM A7 | SRAM A7 |
| 28 | SRAM A6 | SRAM A6 | SRAM A6 | SRAM A6 |
| 27 | SRAM A5 | SRAM A5 | SRAM A5 | CAS[3] |
| 26 | SRAM A4 | SRAM A4 | CAS[2] | CAS[2] |
| 25 | SRAM A3 | CAS[1] | CAS[1] | CAS[1] |
| 24–15 | RAS[9:0] | RAS[9:0] | RAS[9:0] | RAS[9:0] |
| 14–9 | CAS[9:4] | CAS[9:4] | CAS[9:4] | CAS[9:4] |
| 8 | CAS[3] | CAS[3] | CAS[3] | SRAM A2 |
| 7 | CAS[2] | CAS[2] | SRAM A1 | SRAM A1 |
| 6 | CAS[1] | SRAM A0 | SRAM A0 | SRAM A0 |

SRAM AX — Address bit into Decode SRAM
CAS[X] — Column Address X
RAS[X] — Row Address X The following is a corresponding table for daughter boards populated with 4×4 Mbit DRAMS.

TABLE 2

4 × 4 MBit DRAMs

| | INTERLEAVE FACTOR | | | |
|---|---|---|---|---|
| ODY ADR | NON-INTLVD | 2-WAY | 4-WAY | 8-WAY |
| 31 | SRAM A9 | SRAM A9 | SRAM A9 | SRAM A9 |
| 30 | SRAM A8 | SRAM A8 | SRAM A8 | SRAM A8 |
| 29 | SRAM A7 | SRAM A7 | SRAM A7 | CAS[3] |
| 28 | SRAM A6 | SRAM A6 | CAS[2] | CAS[2] |
| 27 | SRAM A5 | CAS[1] | CAS[1] | CAS[1] |
| 26 | RAS[10] | RAS[10] | RAS[10] | RAS[10] |
| 25 | CAS[10] | CAS[10] | CAS[10] | CAS[10] |
| 24–15 | RAS[9:0] | RAS[9:0] | RAS[9:0] | RAS[9:0] |
| 14–9 | CAS[9:4] | CAS[9:4] | CAS[9:4] | CAS[9:4] |
| 8 | CAS[3] | CAS[3] | CAS[3] | SRAM A2 |
| 7 | CAS[2] | CAS[2] | SRAM A1 | SRAM A1 |
| 6 | CAS[1] | SRAM A0 | SRAM A0 | SRAM A0 |

Since the utilization of a memory bank depends upon the writing of a corresponding bit into the SRAM 95, it will be seen that the system and method of the present invention also provides a means for effectively removing a bank from operation without physically disconnecting it, i.e., under software control. Accordingly, if a bank is determined to be causing too many ECC bits, it can be automatically written out of the memory configuration merely by writing to the SRAM a new table which does not employ that bank. Preferably, if the diagnostic program determines that a memory bank is faulty, it also stores data indicating that fact in the corresponding Resume' PROM, so that, when the system is next initialized, the defective bank can be omitted from the configuration from the very start of operation.

In addition to automatically accommodating different numbers of memory banks on a single motherboard, the memory system of the present invention can also automatically accommodate memory banks which are populated by DRAMS of speeds which are different from one daughterboards to the next. Each daughterboard incorporates its own independent timing means, e.g., a delay line, which causes a data ready signal provided back to the motherboard to be generated at a time appropriate for the particular type of D RAM chip populating that daughterboard. Thus, even though successive data reads may be obtained from different daughterboards in accordance with the flexible interleaving system described hereinbefore, access to the data will be provided at the earliest time consistent with the particular memory devices (D RAMs) which are being read.

Each memory bank is divided into two sections, hereinafter referred to as LEAF A and LEAF B, which are selected or decoded by address bit 4. Each of the leaves is 128 bits wide so that, by reading both leaves, 256 bits may be obtained. Each 128 bit section of data is referred to hereinafter as a beat. As indicated previous, the data quantities referred to in this description are the numbers of data bits themselves and it should be understood that an appropriate number of parity or ECC bits will accompany the data bits. The D RAM chips are accessed in a RAS before CAS manner and, by accessing two column addresses within one row address cycle, a total of 512 bits may be obtained, i.e., four beats. This mode of accessing, hereinafter referred to as double pumping, incurs a modest time delay penalty, i.e., the time to precharge the column address lines, but has the advantage that a contiguous quantity of data corresponding to a cache line is obtained. Further, much of the column precharge delay is needed anyway due to the time required to couple data through the bus exchangers to the system bus.

Figure 2:
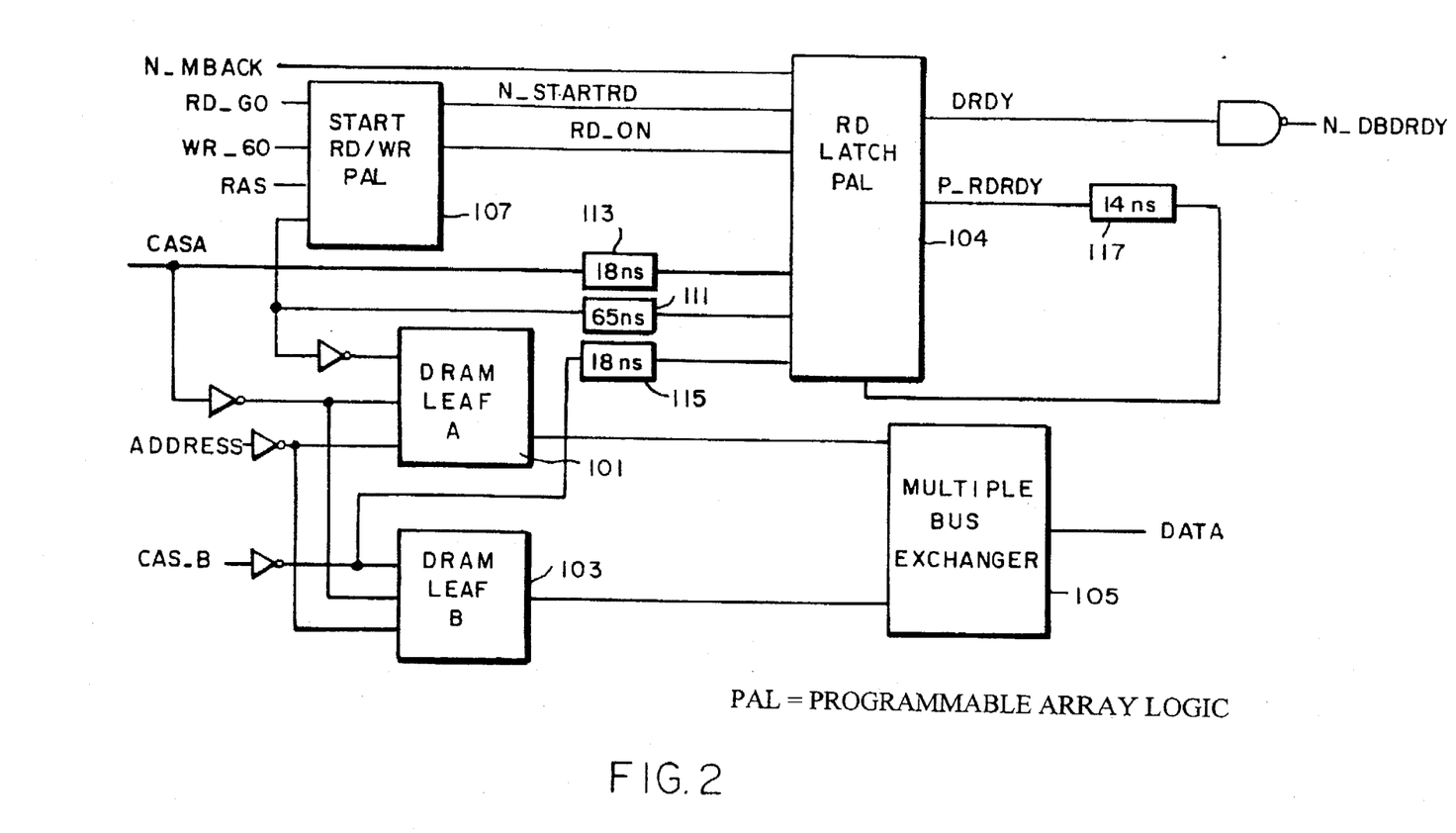
FIG. 2 is a block diagram of logic, including independent delay means, employed in each of the memory banks of the FIG. 1 system.

Referring now to FIG. 2, the first D RAM memory section (leaf A) is designated by reference character 101 while leaf B is designated by reference character 103. Data read out of the memory sections is coupled through to the system bus through multiple bus exchangers 105. Combinatorial logic for combining various signals obtained from the motherboard is performed by means of a PAL (programmable array logic) integrated circuit designated by reference character 107 and another PAL 104 is employed for combining certain of these derived signals with various delayed signals as described hereinafter.

Figure 3:
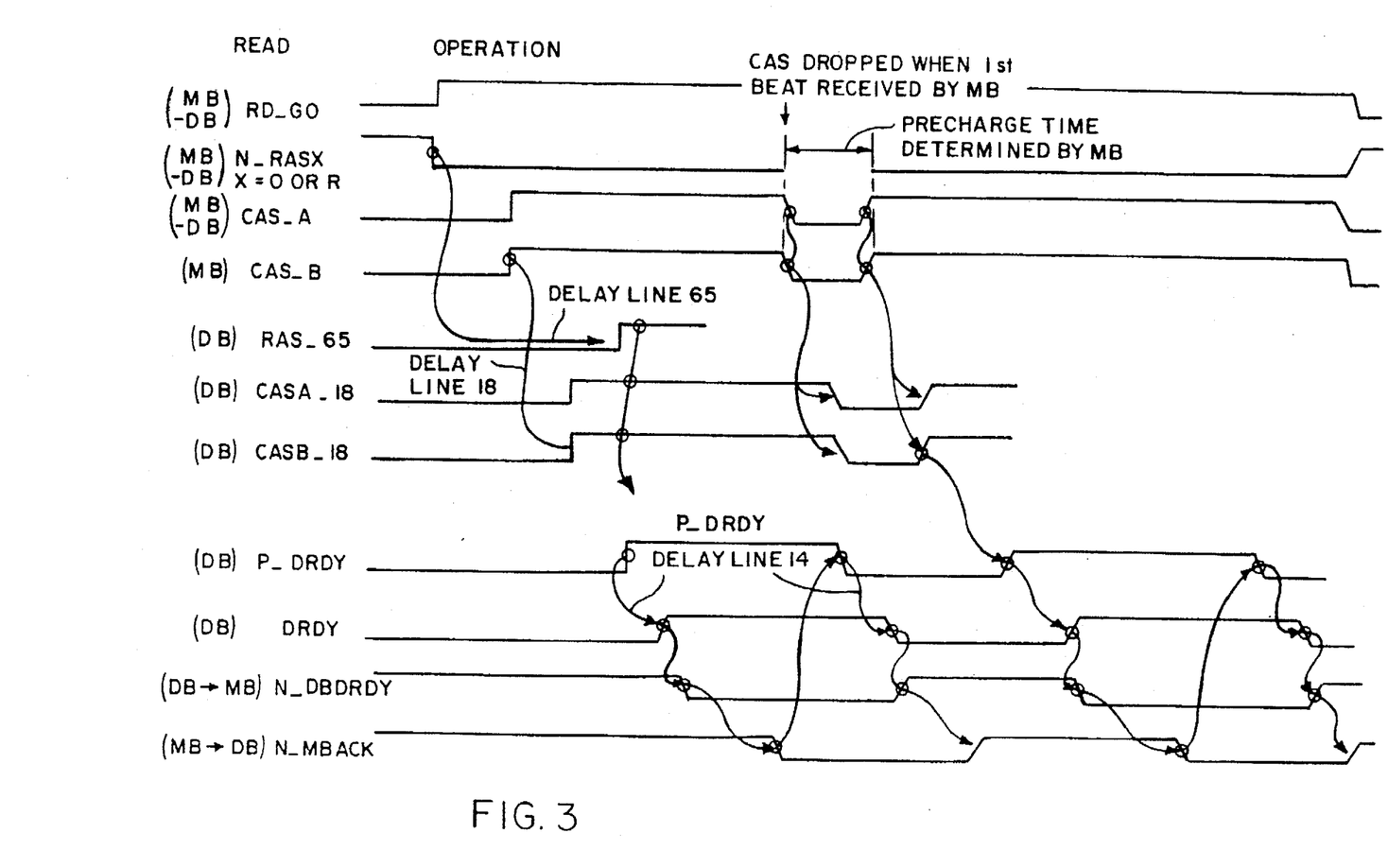
FIG. 3 is a timing diagram illustrating sequencing of signals occurring in the circuitry of FIG. 3.

In the particular embodiment being described herein, the memory bank is populated by 4 megabit D RAM chips which can provided valid data as soon as 60 nanoseconds after the row address strobe (RAS) and 15 nanoseconds after the column address strobe (CAS). As is understood by those skilled in the art, both conditions must be met. With reference to FIG. 2, a sixty five nanosecond delay line 111 is utilized to provide a conservative analog of the RAS requirement and eighteen nanosecond delay lines 113 and 115 provide a conservative analog of the CAS timing requirement. In addition, a fourteen nanosecond delay line 117 is utilized to provide a conservative analog of the propagation time through bus exchangers 105. In the diagrams of FIGS. 2 and 3 certain signals are preceded by an N_ which is merely a notation used to indicate that the signal is asserted by going low. However, in the following description these prefixes are omitted.

With reference to FIGS. 2 and 3, once the motherboard has provided the necessary address signals, it asserts the row address strobe signal (RAS). In addition to being applied to the corresponding D RAM elements, the RAS signal initiates timing by the sixty five nanosecond delay line 111. The output from this delay line being designated RAS 65. Shortly after the RAS signal is asserted, the motherboard asserts the column address strobe signals (CAS A and CAS B). These signals are applied separately to allow for data reads of 128 bits. In addition to being applied to the DRAM arrays, these CAS signals initiate timing by the respective delay lines 113 or 115, the outputs from these delay lines being designated CAS A 18 and CAS B 18. During a two beat or four beat read, when all three signals (RAS 65 CAS A 18, and CAS B 18) are active, a pre-data-ready signal (P_DRDY) is asserted. This signal initiates timing by the delay line 117 and, after this interval, the data ready signal (DRDY) is asserted and immediately thereafter conveyed to the motherboard as the signal DBDRDY. This signal indicates to the motherboard that valid data is available from the daughter board.

After it has latched in the read data, the motherboard provides an acknowledgment signal BACK. At essentially the same time, the motherboard begins the precharge of the column address signals (CAS A, CAS B). Assuming the D RAMs are going to be double pumped, that is, two column addresses are going to be read during one row address cycle, the motherboard waits a time appropriate for precharging of the column address lines and then reasserts the column address strobes, CAS A and CAS B. Following this, a second cycle essentially similar to the first is executed However, the row address strobe signal (RAS) merely continues to be asserted from the prior cycle.

While the sixty nanosecond D RAM chips, which are assumed in the example described, are currently most cost effective, it is expected that faster chips will continue to become available. With the arrangement described herein, a daughterboard can be configured for faster memory chips merely by substituting for the delay lines 111, 113 and 115 with components having delay times corresponding to the speed of the new DRAM chips. Further, since each memory bank or daughterboards can be so configured independently of the others, the motherboard can accommodate daughterboards with different timing parameters and still utilize each daughterboard at the highest speed of which the daughterboard is capable. Similarly, if faster bus exchanger integrated circuits become available, these can be readily employed and the daughterboard reconfigured merely by substituting an appropriate component for the delay line 117.

In view of the foregoing it may be seen that several objects of the present invention are achieved and other advantageous results have been attained.

As various changes could be made in the above constructions without departing from the scope of the invention, it should be understood that all matter contained in the above description or shown in the accompanying drawings shall be interpreted as illustrative and not in a limiting sense.

What is claimed is:

1. In a digital computer, an expandable memory system comprising:

a selectable plurality of active memory banks of dynamic RAM each of said active memory banks including means for indicating whether the memory bank is available for read/write purposes, and independent timing means responsive to a read request, for generating a signal to said expandable memory system indicating that data is ready from the respective bank following said read request;

address decoding logic for selecting memory locations as a preselectable function of address signals applied thereto, said address decoding logic including inputs for selectively and dynamically altering said function to provide a plurality of different predetermined interleave patterns which decode successive address segments into different memory banks for preselected groupings of said banks;

a writable memory for providing control signals to said inputs of said address decoding logic; and means for dynamically determining the number of banks of active memory participating in said memory system and for writing, into said writable memory, data which will select that one of said predetermined interleave patterns which corresponds to the number so determined.

2. An expandable memory system as set forth in claim 1 wherein said writable memory is a static RAM.

3. An expandable memory system as set forth in claim 1 wherein said memory system further contains memory banks which are identified as inactive and said interleave pattern operationally removes such inactive banks from said memory system without physical disconnection.

4. An expandable memory system as set forth in claim 1 wherein said independent timing means includes a delay line.

5. In a digital computer, an expandable memory system connected to a host, said memory system comprising:

a dynamically selectable plurality of active memory banks each of said banks comprising a multiplicity of dynamic RAM memory elements which provide data signals a respective predetermined time after the application of address signals thereto;

wherein said memory system includes a programmable address decoder including a writable memory read by a predetermined subset of system address signals and which provides bank address signals which select an individual one of said memory banks to respond to system address signals other than ones includes in said predetermined subset;

wherein said memory system further includes means for dynamically determining the number of banks of active memory interconnected with said memory system and for writing, into said writable memory, data which will provide an interleave pattern corresponding to the number so determined;

in each of said banks, a respective delay means for providing an output signal a respective preselectable time corresponding to said respective predetermined time of the dynamic RAM in the respective memory bank after address signals are applied to the memory elements in that bank; and in each of said banks, signal coupling means responsive to the respective delay means output signal for signalling to said host that data is ready to be transferred from the respective bank to said host.

6. A computer memory control structure comprising:

a dynamically selectable plurality of active memory banks each of said banks comprising a multiplicity of dynamic RAM memory elements which provide data signals a respective predetermined time after the application of address signals thereto; and a memory subsystem providing connections for data signals and for a plurality of system address signals to said memory banks, said subsystem including means for dynamically determining the presence of active memory in each bank;

wherein said subsystem includes a programmable address decoder including a writable memory read by a predetermined subset of said system address signals and which provides bank address signals which select an individual one of said memory banks to respond to system address signals other than ones includes in said predetermined subset;

wherein said subsystem further includes means for dynamically determining the number of banks of active memory interconnected with said memory subsystem and for writing, into said writable memory, data which will provide an interleave pattern corresponding to the number so determined;

wherein each of said banks includes a respective delay means for providing an output signal a respective preselectable time after address signals are applied to the memory elements in that bank, said preselected time corresponding to the respective predetermined time of the respective memory elements; and wherein each of said banks further includes a signal coupling means responsive to the respective delay means output signal for signalling to said subsystem that data is ready to be transferred from the respective bank to said subsystem.

* * * * *